United States Patent Office
3,080,437
Patented Mar. 5, 1963

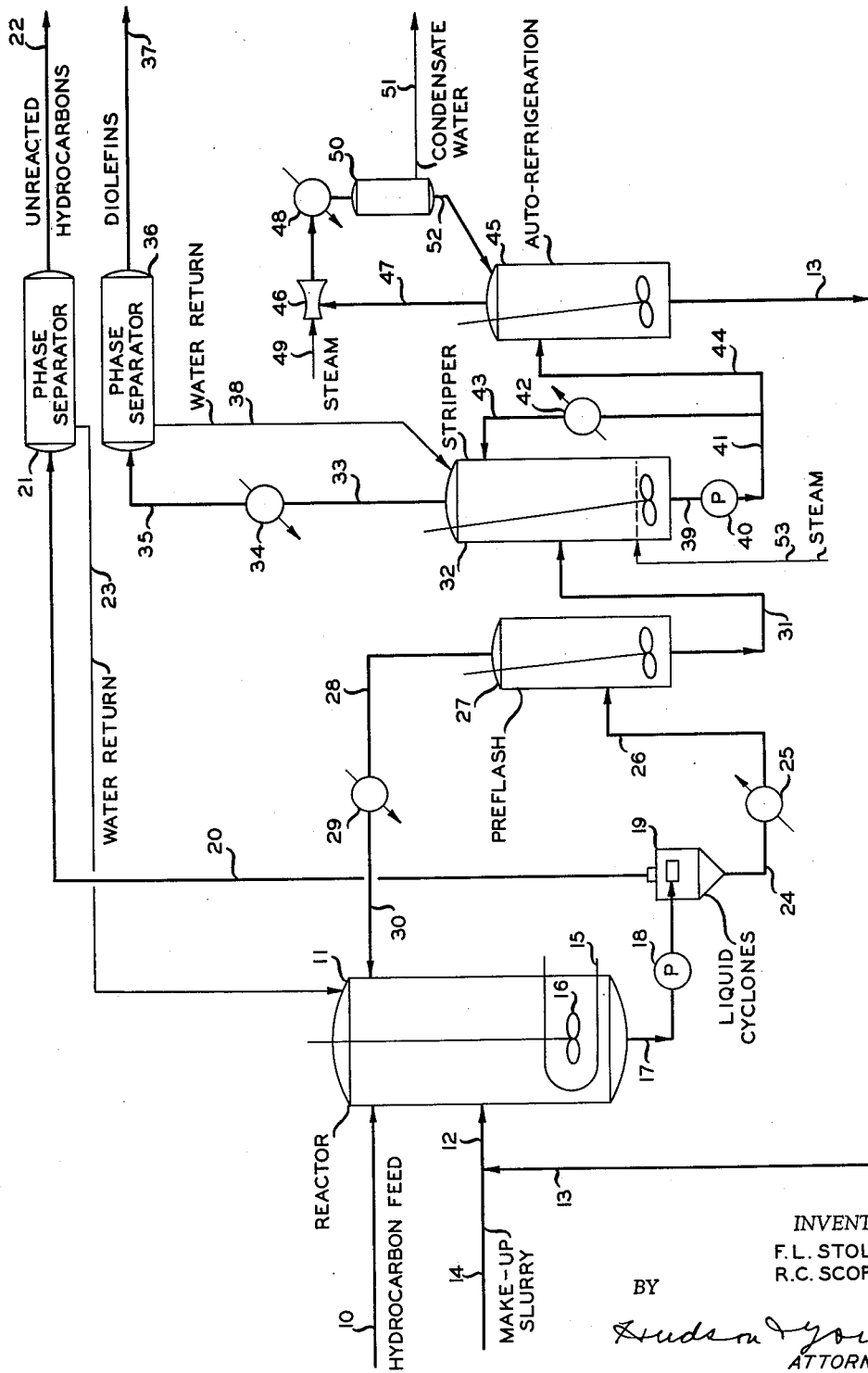

3,080,437
COPPER SALT SLURRY PROCESS FOR
DIOLEFIN SEPARATION
Raymond C. Scofield, Bartlesville, Okla., and Frederick L. Stoller, San Roque, Anzoategui, Venezuela, assignors to Phillips Petroleum Company, a corporation of Delaware
Filed Aug. 31, 1959, Ser. No. 837,020
8 Claims. (Cl. 260—681.5)

This invention relates to the separation and purification of hydrocarbons. In accordance with one aspect, this invention relates to an improved method of removing diolefins from hydrocarbon fractions containing the same by complex formation in a cooled absorption zone followed by separation of diolefins from the complexing agent, the improvement comprising auto-refrigerating hot, stripped complexing agent to cool the same and then recycling said cooled complexing agent to said absorption zone. In another aspect, this invention relates to an improved method of removing diolefins from liquid hydrocarbon fractions containing the same by complex formation, the improvement comprising passing said complex through a cyclone separation zone to remove unreacted liquid hydrocarbons. In still another aspect, this invention relates to an improved method of recovering $C_5$ diolefins from liquid hydrocarbon fractions containing the same, comprising contacting said fractions with a cuprous salt slurry in a refrigerated contactor to form a diolefin-cuprous salt complex, cyclone separating unreacted hydrocarbons from said complex, flash separating additional unreacted hydrocarbons from said complex, decomposing said complex to recover said diolefins and said slurry, reducing the pressure on said slurry to form by evaporative cooling a cooled slurry, and recycling said cooled slurry to said contactor.

The separation of unsaturated hydrocarbons such as diolefins from hydrocarbon fractions containing the same by absorption with a cuprous salt extraction solvent is known in the art. In the reaction of a cuprous salt slurry in water with diolefin hydrocarbons, a cuprous salt-diolefin complex forms at low temperature with evolution of heat. The removal of heat from the absorption reactor or contactor is an ever present problem in the plant. In the separation of certain diolefins from hydrocarbon fractions containing the same the heat of absorption can be removed from the contactor by auto-refrigeration, that is, hydrocarbons are flashed in the reactor, taken overhead, recompressed, cooled and returned to the reactor. However, in the separation of some diolefins, for example, $C_5$ diolefins from hydrocarbon fractions containing the same, the heat of absorption cannot be satisfactorily removed from the reactor by auto-refrigeration, since auto-refrigertion of $C_5$ and heavier hydrocarbons, for example, cannot be obtained without operating the reactor at undesirably low pressures. Therefore, the reactor or contactor must be cooled by some other method in order to maintain refrigerated absorption conditions of about 0° F.

Since decomposition of the complex to recover the desired diolefins is accomplished at an elevated temperature and the contactor is refrigerated, it is, therefore, highly desirable to cool the denuded slurry before recycling it to the reactor. However, it has been found that cooling of hot, stripped slurry by indirect heat exchange is quite impractical and highly unsatisfactory due to the fouling of the heat exchanger. Therefore, it can be seen that the return of hot slurry directly to the reactor is undesirable in that an undue heat load would be put on the reactor and cooling of the slurry by indirect heat exchange is impractical, as discussed above. In accordance with the present invention, the pressure of the hot, stripped absorption medium or slurry is reduced to form by evaporative cooling a cooled absorption medium or slurry for recycle to the contactor without the problems discussed above.

An object of this invention is to provide an improved method and apparatus for the separation and purification of hydrocarbon mixtures. Another object of this invention is the provision of a source of cooling for an absorption zone. Another object is to provide an improved method and apparatus for separating unreacted liquid hydrocarbons from a diolefin-absorption medium complex.

Other aspects, objects, and the several advantages of this invention are apparent from a study of the disclosure, the drawing and the appended claims.

We have found that heavy diolefins such as $C_5$ diolefins can be advantageously recovered from hydrocarbon fractions containing the same by complex formation with a copper salt slurry in a refrigerated reactor and, after removal of the desired diolefins from the complex by stripping or decomposition, the hot cuprous chloride slurry is effectively and efficiently cooled by an auto-refrigeration step by evaporation of water under vacuum before slurry is recycled to the refrigerated reactor.

Although unreacted hydrocarbons can be wholly separated from the slurry by vaporization, we have found that this involves higher utility requirements and normally provides lower recovery of diolefins than is possible on the basis of the present invention. The diolefin always has a definite decomposition pressure over the solid complex. Although this decomposition pressure may be small, vaporization tends to result in some vaporization of diolefin from the complex. No such additional losses occur when the unreacted material is removed as a liquid phase in a phase separator or in a liquid cyclone. Consequently, it is the object of this invention to remove a major portion of the unreacted hydrocarbon in the liquid phase and without vaporization.

A characteristic feature of the pentadiene and heavier diolefins in the commercial concentration range of from 15 to 30 mole fraction is not only their ability to react with the cuprous chloride slurry, but also the ability of the resulting complex to occlude all of the unreacted hydrocarbon. We have found that the addition of a proper amount of an alkylarylsulfonate detergent under the trade name of "Vel" avoids the occlusion of a major portion of the unreacted hydrocarbon. This non-occluded portion rises as a relatively low density hydrocarbon layer in a phase separator and may be decanted. The concentration of the detergent for good phase separation is quite critical. As an illustration, if the amount of the detergent shown in the following example is doubled, then all unreacted hydrocarbon remains occluded and does not separate from the aqueous slurry in a phase separator. The heavier diolefin streams vary in character and it is generally necessary to experimentally determine on a small scale the amount of detergent which produces an optimum phase separation.

We have also found that centrifugal devices are effective and useful in separating out unreacted hydrocarbon materials. The liquid cyclone is suggested for commercial practice, normally in conjunction with a detergent such as Vel.

In accordance with the present invention, an improved method is provided for the recovery of diolefins from a hydrocarbon fraction containing the same and also containing other hydrocarbons which comprises the steps of contacting said fraction with an absorption medium for said diolefins at a low absorption temperature and for a period of time sufficient to permit formation of a solid complex between said diolefins and said absorption medium, separating unreacted hydrocarbons from said complex, decomposing said complex for recovery of said diolefins and said absorption medium, subjecting said absorption medium to auto-refrigeration to cool the same, and returning said cooled absorption medium to said contactor for reuse in said method.

More specifically, in accordance with the present invention, there is provided an improved method for the recovery of $C_5$ diolefins from a liquid $C_5$ hydrocarbon fraction containing the same and also containing other hydrocarbons, which comprises the steps of contacting a liquid hydrocarbon $C_5$ fraction containing diolefins such as

| Piperylene | 1,2-pentadiene |
| Isoprene | 2,3-pentadiene |
| 3-methyl-1,2-butadiene | 1,4-pentadiene | said fraction can also contain cycloolefins, such as cyclopentene, with an aqueous slurry of cuprous chloride which may also contain ammonium chloride at a temperature of about 0° F. and for a period of time sufficient to permit formation of a solid complex between the cuprous chloride and the diolefins, passing said complex to either a liquid cyclone or a phase separator to remove a major portion of the unreacted hydrocarbon as a higher phase, subjecting the complex, partially free of unreacted hydrocarbons, to flashing to remove substantially all of the remaining unreacted hydrocarbons from said complex which are returned to said contacting zone, decomposing said flashed complex to recover said diolefins as a product of the method and said cuprous chloride slurry, evaporatively cooling said cuprous chloride slurry in an auto-refrigeration zone to reduce the temperature of said slurry, and recycling said cooled cuprous chloride slurry to said contacting for reuse in the method.

The absorption medium employed in the practice of the present invention preferably comprises a heavy metal salt capable of forming complexes or addition compounds with the diolefins. Salts of heavy metals of groups IB and IIB of the periodic system, especially salts of such metals in their monovalent form, are suitable. For example, cuprous, mercurous and silver salts can be employed. Cuprous halides and especially cuprous chloride are particularly suitable for the separation of diolefins from hydrocarbon streams containing the same.

Salts of the type described above can be employed in the dry state or suspended in an inert organic solvent or in an aqueous medium. When aqueous solutions are employed, for example, it is desirable to have present an excess of the solid salts so that the absorption medium is, in effect, a salt slurry. Hydrochloric acid and/or ammonium chloride can be present, if desired, to increase the solubility of the heavy metal salts in water. Also, other basic substances can also be present in the absorption medium.

In general, atmospheric or subatmospheric pressures are employed throughout all or at least a part of the system of the present invention. The temperature of the reaction or contacting zone is generally maintained at about —10° F. to about 32° F., preferably about 0° F. The decomposing or stripping zone for removal of the diolefins from the complex is generally maintained within a temperature range of from about 175° F. to 200° F. The hot stripped cuprous salt slurry is cooled by auto-refrigeration to a temperature of about 50° F. or lower before returning the same to the contacting zone.

In order to insure substantially complete absorption of the diolefins, a ratio of reagent to diolefins in the contacting zone is preferably provided in the suspension in which the reagent is present in excess of the stoichiometric amount required for the reaction. Preferably, the excess of cuprous salt should not be too great since this would require handling of excessive quantities of reagent. Ordinarily, from 1.1 to 1.4 times the stoichiometrical equivalent of cuprous halide is sufficient. Generally, if it is necessary to separate cycloolefins from diolefins a much greater amount of ammonium chloride is required than if cycloolefins are not a problem, also substantially more than theoretic amounts of cuprous chloride become necessary.

The degree of agitation rather than the reaction rate itself has been found to determine the residence time necessary to obtain a satisfactory conversion of the diolefin to the complex. Depending on the provisions for agitation, batch reactors normally require a residence time of from 1 to 20 minutes. The residence time needed in continuous tank-type reactors depends on the number of stages employed but is usually relatively longer.

In operating the present method, a better understanding will be obtained by reference to accompanying drawing where a $C_5$ hydrocarbon fraction is contacted with a cuprous chloride slurry in a refrigerated reactor and the slurry after removal of absorbed diolefins is auto-refrigerated before recycling.

Referring now to the drawing, a cooled liquid hydrocarbon $C_5$ fraction containing diolefins such as piperylene, isoprene, etc., is introduced into refrigerated, stirred reactor 11 by way of line 10. An aqueous slurry of cuprous chloride which normally contains from about 1 to about 5 weight percent ammonium chloride is introduced into reactor 11 by way of conduit 12, which is supplied with cuprous chloride slurry by recycle line 13 and make-up slurry line 14. Refrigerating coils 15 are provided within reactor 11 to maintain the reaction temperature at about 0° F. Also, within reactor 11 is a stirrer 16 of suitable design, which aids in providing intimate contact between the hydrocarbon charge and cuprous chloride slurry within reactor 11. Within reactor 11, a reaction between the diolefins and cuprous chloride takes place and a complex is formed.

A diolefin-cuprous chloride complex is removed from reactor 11 by line 17, passed to pump 18 and introduced into cyclone separator 19. Liquid unreacted hydrocarbons are removed from cyclone 19 by way of conduit 20 and passed to phase separator 21. In phase separator 21 unreacted hydrocarbons are removed by way of conduit 22 for further processing, not shown. An aqueous phase is removed from separator 21 and passed through conduit 23 and returned to reactor 11.

Solid complex, also containing some unreacted hydrocarbons is removed from cyclone 19 by way of conduit 24, passed to heater 25 and the temperature of the complex is raised and the heated complex is passed through conduit 26 and introduced into flash zone 27. The complex is heated to a temperature of about 100° F. in heater 25 before introduction into flash zone 27. Flashed vapors are removed from zone 27 by way of conduit 28, cooled in heat exchanger 29 and passed through conduit 30 and introduced into reactor 11. This stream can contain some diolefins which were not reacted on the first pass through reactor 11 and are advantageously recycled.

Unvaporized complex is removed from the base of flash zone 27 by way of conduit 31 and introduced into stripping zone 32. The complex is heated at near atmospheric pressure in stripper or decomposition zone 32 to a decomposition temperature of from about 175° F. to about 200° F. Steam can be added as a source of heat, if necessary, through conduit 53 into a lower portion of zone 32. Absorbed diolefins are removed from the top of stripping zone 32 by way of conduit 33, passed to cooler 34 and introduced into phase separator 36 by way of conduit 35. Then in phase separator 36 the stripping zone overhead is separated into a diolefin fraction removed by way of conduit 37 and an aqueous phase is returned to stripping zone 32 by way of conduit 38.

The cuprous chloride slurry, substantially free of diolefins, is removed from the base of stripping zone 32 by way of conduit 39, passed through pump 40 and a part of the slurry is passed through conduit 41, heater 42, and conduit 43 for re-introduction into an upper portion of stripping zone 32. The decomposition temperature maintained in stripping zone 32 is preferably maintained, in part, by recycling a portion of the slurry through heater 42. The remainder of the cuprous chloride slurry is passed to conduit 44 and introduced into auto-refrigeration zone 45, which is maintained at subatmospheric pressure. A subatmospheric pressure is maintained within auto-refrigeration zone 45 by means of steam jet injector 46. Vapor evaporated from the slurry is removed from auto-refrigeration zone 45 by way of conduit 47 and introduced into injector 46 and then passed through condenser 48 along with steam introduced into injector 46 by conduit 49. Water condensate is removed by conduit 51 from separator 50 and a portion of the condensate can be returned to auto-refrigeration zone 45 to maintain a water balance. The temperature of the cuprous chloride slurry is reduced from about 200° F. as removed from stripper 32 to about 50° F. in zone 45. Cooled cuprous chloride slurry is removed from the base of zone 45 and returned to reactor 11 by way of conduit 13.

A more comprehensive understanding of the invention may be obtained by referring to the following illustrative example which is not intended, however, to be unduly limitative of the invention.

*Example*

The main features of the present invention have been illustrated in experimental work carried out in the batch manner. The slurry employed had the following composition:

| | Parts by weight |
|---|---|
| Cuprous chloride | 1.0 |
| Water | 1.0 |
| Ethylene glycol | 0.5 |
| Ammonium chloride | 0.075 |
| Hydrochloric acid (37%) | 0.075 |
| Vel | 0.05 |

This slurry was reacted at 32° F. with a synthetic mixture made up of isopentane, 2-methylbutene-2 and isoprene to simulate a commercial plant stream. The amount of slurry employed was 93 percent of the theoretical when calculated on the basis of 2 moles of cuprous chloride per mole of isoprene. However, about 120 percent of theoretical is normally used.

An unreacted hydrocarbon phase separated out soon after the reactor agitator was stopped. This was decanted at the end of a 5 minute period. The remaining slurry contained some occluded unreacted hydrocarbon which was removed by vaporization at 32° F. under vacuum. Vaporization started at a pressure of about 20 inches of mercury below atmospheric pressure and was halted when the pressure reached 28 inches of mercury below atmospheric pressure and visual evidence was noted that the isoprene-cuprous chloride complex was beginning to decompose. The unreacted material recovered by vaporization was 59 percent of the total and phase separation accounted for 41 percent of the total. The remaining slurry was then stripped of the isoprene by heating at atmospheric pressure. Stripping was discontinued when the temperature reached about 190° F. and it was evident that all available isoprene had been removed.

Analysis was made by chromatography and evaluated by peak averaging. The composition of the charge on a mole basis was 39.0 percent isoprene, 27.8 percent 2-methylbutene-2 and 33.2 percent isopentane. The isoprene content of the liquid phase from the phase separator was 5.4 percent, the isoprene content of the vaporized hydrocarbon was 6.8 percent and the isoprene product was 99.9+ percent isoprene.

Direct cooling of the denuded slurry leaving the stripper vessel has been employed unsuccessfully. Invariably, within a matter of 10 minutes, a heavy layer of solids built up in the exchanger tubes and the cooling effect was very drastically reduced. This feature has handicapped the use of cuprous chloride slurries even though their capacity on a weight basis for butadiene is about 8 times that of the cuprous ammonium acetate solvent which is in wide commercial usage. The large potential equipment savings and utilities savings implied by this difference in capacities have not been realized, mainly because of the problem of cooling the slurry.

We have found that the denuded aqueous slurry can be cooled by auto-refrgeration in an efficient manner. This means of cooling avoids the problem of exchanger fouling by the slurry.

Reasonable variation and modification are possible within the scope of the foregoing disclosure, the drawing, and the appended claims to the invention the essence of which is that in the recovery of diolefins from hydrocarbon fractions containing the same and also containing other hydrocarbons by contacting with an aqueous slurry of cuprous chloride in a refrigerated contacting zone unreacted hydrocarbons are separated from the contacting effluent complex by cyclone separation and the cuprous chloride, after being stripped of absorbed diolefin is evaporatively cooled by reducing the pressure on said slurry to form a cooled slurry for recycle to said contacting for reuse in the method.

We claim:

1. A method for recovery of $C_5$ diolefins from a liquid $C_5$ hydrocarbon fraction containing the same and also containing other hydrocarbons which comprises the steps of contacting said fraction with an aqueous slurry of a copper salt absorption medium for said diolefins in a refrigerated contacting zone for a period of time sufficient to permit formation of a solid complex between said diolefins and said absorption medium, separating unreacted hydrocarbons from said complex and recycling at least a portion of said separated hydrocarbons to said contacting zone, decomposing said complex for recovery of said diolefins and an aqueous slurry of said absorption medium, reducing the pressure on said recovered slurry to form by evaporative cooling a cooled slurry of said absorption medium, and returning said cooled absorption medium slurry to said contacting for reuse in said method.

2. A method according to claim 1 wherein said contacting is effected at a temperature of about 0° F.

3. A method according to claim 1 wherein said diolefin is isoprene.

4. A method for recovery of $C_5$ diolefins from a liquid $C_5$ hydrocarbon fraction containing the same and also containing other hydrocarbons which comprises the steps of contacting said fraction with an aqueous slurry of a cuprous salt absorption medium in a refrigerated contactor at a temperature of about 0° F. and for a period of time sufficient to permit formation of a complex between said diolefins and said cuprous salt, passing said complex to a cyclone separation zone to remove part of the unreacted hydrocarbons, subjecting cycloned complex partially free of unreacted hydrocarbons to flashing to remove substantially all of the remaining unreacted hydrocarbons from said complex which are returned to said contactor, decomposing said flashed complex to recover diolefins as a product of the method and said cuprous salt slurry, evaporatively cooling said cuprous salt slurry in an auto-refrigeration zone, and recycling said cooled cuprous salt slurry to said contactor for reuse in the method.

5. A method according to claim 4 wherein said slurry is an aqueous slurry of cuprous chloride containing 1 to 5 weight percent ammonium chloride.

6. A method according to claim 4 wherein said diolefin is isoprene.

7. A method for recovery of $C_5$ diolefins from a liquid $C_5$ hydrocarbon fraction containing the same and also containing other hydrocarbons which comprises the steps of contacting said fraction with an aqueous slurry of a cuprous salt absorption medium in a refrigerated contactor at a temperature of about 0° F. and for a period of time sufficient to permit formation of a complex between said diolefins and said cuprous salt, passing said complex to a cyclone separation zone to remove part of the unreacted hydrocarbons, subjecting cycloned complex partially free of unreacted hydrocarbons to flashing to remove substantially all of the remaining unreacted hydrocarbons from said complex which are returned to said contactor, decomposing said flashed complex at a temperature of about 200° F. to recover diolefins as a product of the method and said cuprous salt slurry absorption medium, evaporatively cooling said cuprous salt slurry in an auto-refrigeration zone to reduce the temperature of the same to about 50° F., and recycling said cooled cuprous salt slurry to said contactor for reuse in the method.

8. A method for recovery of $C_5$ diolefins from a liquid $C_5$ hydrocarbon fraction containing the same and also containing other hydrocarbons which comprises the steps of contacting said fraction with an aqueous cuprous chloride slurry in a refrigerated contacting zone for a period of time sufficient to permit formation of a solid complex between said diolefins and said slurry, phase separating unreacted hydrocarbons from said complex and recycling at least a portion of said separated hydrocarbons to said contacting zone, decomposing said complex for recovery of said diolefins and said slurry, reducing the pressure on said slurry to form by evaporative cooling a cooled slurry, and returning said cooled cuprous chloride slurry to said contacting for reuse in said method.

References Cited in the file of this patent

UNITED STATES PATENTS

| | | |
|---|---|---|
| 2,386,734 | Wolk | Oct. 9, 1945 |
| 2,645,608 | Linn et al. | July 14, 1953 |
| 2,960,549 | Finigan | Nov. 15, 1960 |